(12) United States Patent
Atman et al.

(10) Patent No.: US 6,442,566 B1
(45) Date of Patent: Aug. 27, 2002

(54) FRAME-BASED KNOWLEDGE REPRESENTATION SYSTEM AND METHODS

(75) Inventors: Russ B. Atman, Menlo Park; Neil F. Abernethy, Palo Alto, both of CA (US)

(73) Assignee: Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/464,642

(22) Filed: Dec. 15, 1999

Related U.S. Application Data
(60) Provisional application No. 60/112,423, filed on Dec. 15, 1998.

(51) Int. Cl.[7] .............................................. G06F 17/30
(52) U.S. Cl. .......................................... 707/103; 707/2
(58) Field of Search ....................... 707/2, 103; 706/53; 709/316

(56) References Cited

U.S. PATENT DOCUMENTS

| | | | | |
|---|---|---|---|---|
| 5,265,206 A | * | 11/1993 | Schackelford et al. | 709/316 |
| 5,291,593 A | * | 3/1994 | Abraham et al. | 707/103 |
| 5,813,014 A | * | 9/1998 | Gustman | 707/103 |
| 5,974,407 A | | 10/1999 | Sacks | 707/2 |

OTHER PUBLICATIONS

Nadkarni, P., QAV: querying entity–attribute–value, metadata in a biomedical database, Comp. Meth. Prog. Biomed., 53, pp. 93–103, 1997.

Spector, L., et al., Knowledge representation in PARKA–Part 2: experiments, analysis, and enhancements, Technical Research Report, TR92–10, pp. 0–21, 1992.

Karp, P., et al., A collaborative environment for authoring large knowledge bases, SRI Inter–National, Menlo Park, CA, pp. i–46, 1997.

Farquhar, A. et al, The Ontolingua server: a tool for collaborative ontology construction, Tech Report KSL–96–26, Knowledge Systems Lab., Stanford University, pp. 1–19.

Chaudhri, V., et al., *Open knowledge base connectivity 2.0.3*, pp. i–104, Apr. 9, 1998

* cited by examiner

*Primary Examiner*—Diane D. Mizrahi
(74) *Attorney, Agent, or Firm*—Lumen Intellectual Property Services, Inc.

(57) ABSTRACT

A frame-based knowledge representation system is built on a relational database that is completely transparent to the user. A user at a client machine sends standard knowledge base queries across a distributed computer system and the system translates the queries into a language suitable for querying the database, such as Structured Query Language (SQL). The system stores a hierarchical data model that includes classes, particular instances of the classes, and relations among the classes and instances. Primitive objects, such as classes and instances, are organized with their associated attributes into frames. The system consists of three main tables and auxiliary tables. The frames table stores frames with associated slots and values, along with associated ownerships, access permissions, and other facets. The superclass-set table stores the frames and associated superclasses or ancestor classes. The third table, the classes table, stores class frames, slots, and values, and a slot type designating a slot as own or template. The database also includes tables for security definitions, logging, and other features. To query the knowledge base, the user submits a query, preferably according to the Open Knowledge Base Connectivity protocol, and the system translates the query into SQL. The result is formatted and processed to check user permissions before being returned to the user over the computer network. The system is accessed through a variety of interfaces, including a Web browser and various application programming interfaces.

25 Claims, 9 Drawing Sheets

| Name | Address | Telephone |
|---|---|---|
| Joe Smith | 221 Main St. | 461-8523 |
| Sally Brown | 15 Pine Ca. | 841-9123 |
| Debbie Peters | 21 Oak Dr. | 231-9147 |

Prior Art

*FIG. 1*

- ❖ Thing
  - ➢ Data
    - ▪ Interpreted Data
      - • Crosslink-Length-Data
    - ▪ Measured Data
      - • Biochemical-Data
        - ♦ Antibiotic-Resistance-Data
        - ♦ Binding-Affinity-Data
        - ♦ Cleavage-Data
        - ♦ Compositional-Data
        - ♦ Cross-Linking-Data
        - ♦ Footprinting Data
          - ➢ Chemical-Footprinting-Data
          - ➢ Enzymatic-Footprinting-Data
          - ➢ Fe-Radical-Attack-Data
        - ♦ Ligand-Incorporation-Data
        - ♦ Rna-Partial-Digestion-Data
        - ♦ Sedimentation-Coefficient-Data
        - ♦ Transaction-Rate-Data
      - • Phylogenetic-Data
      - • Physical-Data
    - ▪ Structural-Model-Data
  - ➢ Methods
  - ➢ Organism
  - ➢ Physical-Thing
  - ➢ Reference-Information
  - ➢ RiboWeb-Output Prior Art

FIG. 2

| ID | frame | slot | value | owner | permission | creation date |
|---|---|---|---|---|---|---|
| 181194 | Rna-Mundus-4-1373-9 | Cross-Linked-Thing | 16e-U916 | System | 0 | 3/12/99 |
| 181195 | Rna-Mundus-4-1373-9 | Cross-Linking-Agent | Site-Specific-Psoralan-Apa | System | 0 | 3/12/99 |
| 181196 | Rna-Mundus-4-1373-9 | Reported-By | Rna-Mundus-4-1373 | System | 0 | 3/12/99 |
| 1375 | Rna-Partial-Digestion-Data | Arity | 1 | System | 0 | 3/15/99 |
| 1376 | Rna-Partial-Digestion-Data | Documentation | An experiment in which a | System | 0 | 3/15/99 |
| 1377 | Rna-Partial-Digestion-Data | Domain-Of | Associated-Parts | System | 0 | 3/15/99 |
| 1378 | Rna-Partial-Digestion-Data | Domain-Of | Digesting-Agent | System | 0 | 3/15/99 |
| 1419 | Rna-Partial-Digestion-Data | Instance-Of | Class | System | 0 | 3/15/99 |
| 1420 | Rna-Partial-Digestion-Data | Range-Of | Digesting-Agent-in | System | 0 | 3/15/99 |
| 1421 | Rna-Partial-Digestion-Data | Range-Of | Participates-in-Association | System | 0 | 3/15/99 |
| 1422 | Rna-Partial-Digestion-Data | Subclass-Of | Biochemical-Data | System | 0 | 3/17/99 |
| 181197 | Rna-Powers-1-194 | Instance-Of | Journal-Article | System | 0 | 3/17/99 |
| 181198 | Rna-Powers-1-194 | Journal-Name | Rna-Journal | System | 0 | 3/17/99 |
| 181199 | Rna-Powers-1-194 | Title | Hydroxyl radical foot prin | System | 0 | 3/17/99 |

Frames: Table

FIG. 4

| ID | slot type | frame | slot | value | facet | facet-value |
|---|---|---|---|---|---|---|
| 150 | own | Archaebacterium | Has-Instance | Methanococcus-Vannielli | | |
| 156 | own | Archaebacterium | Has-Instance | Sulfolobus-Solfataricus | | |
| 157 | own | Archaebacterium | Instance-Of | Class | | |
| 158 | own | Archaebacterium | Subclass-Of | Organism | | |
| 159 | own | Atom | Subclass-Of | Any elemental atom, | | |
| 160 | own | Atom | Documentation | 1 | | |
| 161 | own | Atom | Arity | Physical-Thing | | |
| 162 | own | Base-Conservation | Subclass-Of | 1 | | |
| 163 | own | Base-Conservation | Arity | An analysis of the level | | |
| 164 | own | Base-Conservation | Documentation | Class | | |
| 165 | own | Base-Conservation | Instance-Of | Phylogenetic-Data | | |
| 166 | own | Base-Interaction | Arity | 1 | | |
| 167 | own | Base-Interaction | Documentation | All phylogenetic data | | |
| 168 | own | Base-Interaction | Instance-Of | Class | | |

Classes: Table

*FIG. 6*

Browse ▼ | Ribosome-2-pub ▼ | Go

User Guest Date: 7/6/99    End Session

▼Thing
  ▷Data
  • Methods
  ▷Organism
  ▷Physical-Thing
  ▽Reference-Information ← 112
      • Coordinate-System
      • Ftp-Files
      • Individuals
      ▽Publication
          • Non-Peer-Reviewed-Publication
          ▷Peer-Reviewed-Publication
              • Journal-Article 108  110
102

Browse Instance: Abb-Cooperman-208-554

| Slot | Value |
|---|---|
| ?Instance-Of | Journal-Article |
| ?Authors | Cooperman-B-S Dondon-J Expert-Bezanion-A |
| ?Journal-Name | Archives-Of-Biochemistry-And-Biophysics |
| ?Publication-Year | 1981 |
| ?Pubmed-Link | http://www.ncbi.nlm.nih.gov/htbin-post/Entrez/query?uid=7020604&form= |
| ?Reports | Abb-Cooperman-208-554-1 Abb-Cooperman-208-554-10 |
| | Abb-Cooperman-208-554-11 Abb-Cooperman-208-554-12 |
| | Abb-Cooperman-208-554-13 Abb-Cooperman-208-554-2 Abb-Cooperman |
| | Abb-Cooperman-208-554-4 Abb-Cooperman-208-554-5 Abb-Cooperman |
| | Abb-Cooperman-208-554-7 Abb-Cooperman-208-554-8 Abb-Cooperman |
| ?Title | IF-3 Crosslinking to Escherichia_coli_Ribosomal30S Subunits by Three Dif Light-Dependent Procedures: Identification of 30S ProteinsCrosslined to IF-3 a New Two-Stage Crosslinking Reagent, p-Nitrobenzylmaleimide |

Find
Matching:
Match    ⦿Frame   ○Value   ○Advanced
         ⦿Exact   ○Fuzzy   ○List 104                                    106

| User: | Create New Class |
|---|---|
| • Change Password<br>• Update User Info<br>• Set up New Account<br>• Get Slots Used By Class<br>• Upload From File | Owner: mshewett<br><br>*Note: Only single value allowed (i.e., no space) in the non-documentation fields.*<br><br>Class Name: [Non-Publication-Ref] (required)<br><br>Instance-Of: Class<br><br>Documentation: [Reference information other than publication.]<br><br>Subclass-Of: [---+Reference-Information]<br><br>Superclass-Of (User 'Ctrl'/'Shift' to select multiple values): (Select child class(es), optional, multiple OK)<br>+Thing<br>---+Data<br>-----+Interpreted-Data<br>------+Crosslink-Length-Data<br>----+Measured-Data<br>------+Biochemical-Data<br>---------+Antibiotic-Resistance-Data<br><br>Arity: [         ] (number)<br><br>Frame Permission: Public, readable by everyone, writable by superuser only<br><br>[Create New Class]   [Reset] |
| Instance:<br>• Create<br>• Delete<br>• Edit<br>• Rename | |
| *System Administrator Only*<br>Class:<br>• Create<br>• Delete<br>• Edit<br>• Rename | |
| Slot:<br>• Create<br>• Delete<br>• Edit<br>• Rename | |

FRAME-BASED KNOWLEDGE REPRESENTATION SYSTEM AND METHODS

CROSS-REFERENCE TO RELATED APPLICATIONS

This application is based on provisional application No. 60/112,423 filed Dec. 15, 1998, which is herein incorporated by reference.

STATEMENT REGARDING FEDERALLY SPONSORED RESEARCH OR DEVELOPMENT

This invention was supported in part by grant numbers DBI-9600637 from the National Science Foundation (NSF), and LM-05652 and LM-06422 from the National Institutes of Health (NIH). The U.S. Government has certain rights in the invention.

FIELD OF THE INVENTION

This invention relates generally to information management systems. More particularly, it relates to a frame-based knowledge representation system built using a relational database.

BACKGROUND ART

One of the growing problems facing scientific researchers is how to integrate and process the enormous amount of data being produced daily. While a great deal of data is available on the World Wide Web, simply having access to the data is useless without robust methods for searching, organizing, and analyzing the data. Various data models have been developed for storing information that can be categorized using ontologies. An ontology is a system that specifies the classes and relations among classes within a domain of discourse. As ontologies become more complex, existing tools for representing data are no longer able to sufficiently represent the data.

Relational database management systems (RDBMS) are by far the most dependable and widely used architectures for building large databases. They contain a few tables of data in which one or a few dependent values are associated with a set of useful independent features that can be searched quickly. An example of a RDBMS table is shown in FIG. 1. By searching on the names, address and telephone numbers for each person can be retrieved quickly. In general, relational databases are most effective to use and easy to maintain when there are a limited number of tables of information, linked together logically, and with a very large number of records in each table. They are also an ideal solution when the structure of the data model is very well understood, not subject to change, and in routine use. Changes to queries and data fields are difficult to implement without completely taking the system out of use and restructuring the model. For example, adding an email address for each person in the database containing the table of FIG. 1 requires redesign of the table structure (either a new column or table) and existing queries. Furthermore, for many data sets, the structure is too complex to be represented effectively by a relational database. Straightforward relational representations can leave out important dependencies of interest, and effectively fit the data to the capabilities of the database structure, instead of fitting the structure to the data. When the data model becomes a large network of interacting tables, queries are also much more difficult to write.

More flexible data structures, known as knowledge bases, have been developed to more closely model the entities in the system of interest and the interactions among them. The key distinction between a knowledge base and a relational database is the manner of organization of the data. In a relational database, data is organized into tables that are accessed by specifying rows and columns of the table—the tables do not reflect conceptual knowledge of the data. In contrast, design and organization of knowledge bases requires conceptual knowledge and representation of the data. In a knowledge representation system, all of the concepts in the domain of discourse are organized into a hierarchical tree of classes, with instances of classes located at the leaves of each branch. Further, the attributes associated with instances are stored with the instance, and not distributed throughout all of the tables of a relational data model.

The two primary innovations in knowledge bases have been object oriented databases and frame-based representation systems. Object oriented approaches allow more modular modeling than relational databases. Each piece of data in the system is considered an object, and the properties of an object are stored locally with the object, along with pointers to related objects. Complex data models are easier to implement, and hierarchies of objects can be created to help organize the large amounts of information. These systems typically provide benefits over relational database systems in the richness of available queries over more complex data types. However, object oriented databases have significant drawbacks that have prevented their acquiring a broad base of established users. They require not only that a researcher specify the properties of entities, but also that they map them onto programming language and database structures. Users interested in the stored information often have neither time for nor interest in learning about the underlying database structure. In addition, object oriented databases suffer from the lack of a universally agreed upon query language.

Frame-based representation systems can be considered object oriented architectures that provide built-in support for dynamic and hierarchical data modeling, for distinguishing between general concepts and particular instances of these concepts, for associating particular attributes with each concept, for inheriting attribute values from parent concepts, and for linking concepts with named relationships. They allow modification of the data model without the need to rebuild the structure, and have a common communication protocol for reading to and writing from the knowledge bases. Developers have created several frame-based knowledge representation tools, including Ontolingua (A. Farquhar, R. Fikes, and J. Rice, "The Ontolingua Server: A Tool for Collaborative Ontology Construction," Tech. Report KSL-96-26, Knowledge Systems Laboratory, Stanford University, Stanford, Calif., 1996); Protégé (M. A. Musen et al., "Protégé-II: An Environment for Reusable Problem-Solving Methods and Domain Ontologies," *Proc. IJCAI'93 1993 Int'l Joint Conf. Artificial Intelligence*, Morgan Kaufmann, San Francisco, 1993); and Theo (T. Mitchell et al., "THEO: A Framework for Self-Improving Systems," *Architectures for Intelligence*, K. Van Lehn, ed., Lawrence Erlbaum, Hillsdale, N.J., 1989). Such tools have an array of features, default reasoning strategies, and knowledge-representation constraints. However, some require users to install special software, and others lack important features, such as a persistent back-end storage system for scalability, facilities for controlling access based on user permissions, an API for prototype development, or easy compatibility with Web protocols.

Several existing frame-based systems map a knowledge model into a relational database, thereby solving the above-described problem of requiring specialized software to implement knowledge representation systems. These systems instead allow developers to use well-known and widely available databases along with their existing tools, providing systems that that are easy to use and access through a variety of interfaces. For example, the PERK database back-end to the GKB-Editor (P. D. Karp, K. L. Myers, and T. Gruber, "The Generic Frame Protocol," Proc. IJCAI-95. 1995 Int'l. Joint Conf. Artificial Intelligence, Morgan Kaufmann, San Francisco, 1995, pp. 768–774) and EcoCyc frame based knowledge-base tool (P. D. Karp et al., "EcoCyc: Electronic Encyclopedia of *Escherichia Coli* Genes and Metabolism," *Nucleic Acids Research,* 27(1), pp. 55–58, 1999) both use a relational database for storage. The PERK storage system is discussed in detail in P. D. Karp, V. K. Chaudhri, and S. M. Paley, "A Collaborative Environment for Authoring Large Knowledge Bases, 1997. In the PERK system, individual frames (objects and associated attributes) are stored in a RDBMS as compressed ASCII text and are unpacked into memory on demand. Frames must be loaded from the flat file in order to be queried, leading to a start-up delay and limits on scalability. More importantly, the client machine accessing the information stored on PERK must have special software to unwrap the objects and put them in temporary storage.

A knowledge representation model built on a relational database is disclosed in P. M. Nadkarni, "QAV: querying entity-attribute-value metadata in a biomedical database," *Computer Methods and Programs in Biomedicine,* 53, pp. 93–103, 1997. However, the database structure cannot fully support a frame-based knowledge representation system, which contains a hierarchy of classes and particular instances of classes, because it does not necessarily include the key relation of "instance of." Furthermore, users querying the database must have explicit knowledge of the underlying structure, and applications that interact with the data must be designed specifically for the particular database system used.

There is still a need for a knowledge base data storage system that can serve large amounts of data to a variety of client interfaces and that uses standard relational database tools and standard knowledge-base protocols.

OBJECTS AND ADVANTAGES

Accordingly, it is a primary object of the present invention to provide a frame-based knowledge representation system built on a commercial relational database management system that is transparent to a user. Benefits associated with relational databases, including good performance, data coherency, concurrent users, and automatic backup, are therefore also provided.

It is a further object of the invention to provide a knowledge base that requires only conventional relational database management software, and does not require specialized software. The knowledge base is therefore easy to use and develop without requiring specialized skills.

It is another object of the present invention to provide a knowledge base that is compatible with the current standard knowledge base query protocol, Open Knowledge Base Connectivity, thereby making the underlying database structure transparent to users and developers.

It is an additional object of the invention to provide a knowledge base system that is highly scalable to large data sets.

It is a further object of the invention to provide a knowledge base that is both flexible and highly structured, allowing for easy modification of the structure as the data model develops, and also for complicated hierarchies of data.

It is another object of the present invention to provide a frame-based representation system that allows for data ownership and access privileges to be specified for each piece of data.

It is an additional object of the invention to provide a knowledge base that may be accessed through a Web-accessible browser or through Application Programming Interfaces, allowing for universal accessibility of data and facilitating creation of new interfaces, while maintaining transparency of the underlying data structure.

SUMMARY

These objects and advantages are attained by a frame-based representation system built on a relational database that is hidden from the user. While the data model is consistent with other frame-based systems, it uses a simple and novel data structure to organize and store the ontology and instances. Standard frame-based queries for retrieving specific portions of the stored data are implemented in a novel manner that is consistent with the underlying data structure.

The present invention provides a computer-readable medium encoded with a relational database for storing a frame knowledge system that has classes, relations, and instances of the classes. The database includes a frames table that has columns for storing frames, including class frames representing classes and instance frames representing instances, at least one slot associated with each of the frames, and a value associated with each of the slots. The slots represent relations, and include the relation known as instance-of, which describes the relation between an instance of a class and the class. Preferably, the frames table also has columns for storing an access permission, an ownership, and at least one facet associated with each slot.

Preferably, the database also includes a classes table that has columns for storing the class frames with associated class slots and class values, all of which are also stored in the frames table. However, the classes table also includes a slot type—own or template—associated with each slot, and distinguishes between own slots, which characterize the class, and template slots, which characterize instances of the class. Each template slot associated with a particular class frame in the classes table is also stored in the frames table, where it is associated with a corresponding instance frame of the particular class. The database may also include a class hierarchy table that has columns for storing class frames and at least one superclass associated with each class frame.

The present invention also provides a method for querying a frame-based representation system that contains a set of relational database tables for storing frames and associated attributes. The method occurs in a server in a distributed computer system, and includes the following steps: receiving a query in a first format for a subset of frames from a client computer; translating the query into a second format for querying the tables; applying the query in the second format to the set of tables to select the subset, and transmitting output including the subset to the client computer. The first format is preferably a knowledge base format, most preferably OKBC, and the second format is preferably a relational database format, most preferably SQL. The query in the second format includes a predetermined attribute related to the query in the first format, and each frame in the retrieved subset is associated with the predetermined attribute. The query in the second format may be applied to one, some, or all of the tables. Preferably, the set of relational database tables includes the tables described above. In that case, the predetermined attribute includes a predetermined slot and predetermined value. The method preferably includes a step of processing the subset to generate formatted output. The processing step may include comparing an access permission of each retrieved frame, stored in the frames table, with a client identifier for the client computer. Based on the comparison, it is determined whether the client may access the frames in the subset. The database may be stored on the server or on a database computer that is distinct from the server.

The present invention also provides a method for adding data to a frame-based representation system that contains a set of relational database tables for storing frames and associated attributes. The method occurs in a server in a distributed computer system, and includes the following steps: receiving a query in a first format to create a new frame from a client computer; translating the query into a second format for querying the tables; and applying the query in the second format to the set of tables to create a new record. The first format is preferably a knowledge base format, most preferably OKBC, and the second format is preferably a relational database format, most preferably SQL. The second format includes parameters related to the query in the first format, and the new record represents the new frame and contains the parameters. Preferably, the tables are the tables described above, and the parameters include a predetermined slot and value. Preferably, the new record also contains a client identifier associated with the client computer.

BRIEF DESCRIPTION OF THE FIGURES

FIG. 1 illustrates a table of a prior art relational database management system.

FIG. 2 is an example of a prior art class hierarchy showing classes and subclasses.

FIG. 4 illustrates a frames table of the present invention.

FIG. 6 illustrates a classes table of the present invention.

FIG. 8 illustrates a Web browser interface used with the present invention, in browse mode.

FIG. 9 illustrates a Web browser interface used with the present invention, in edit mode.

DETAILED DESCRIPTION

Figure 3:
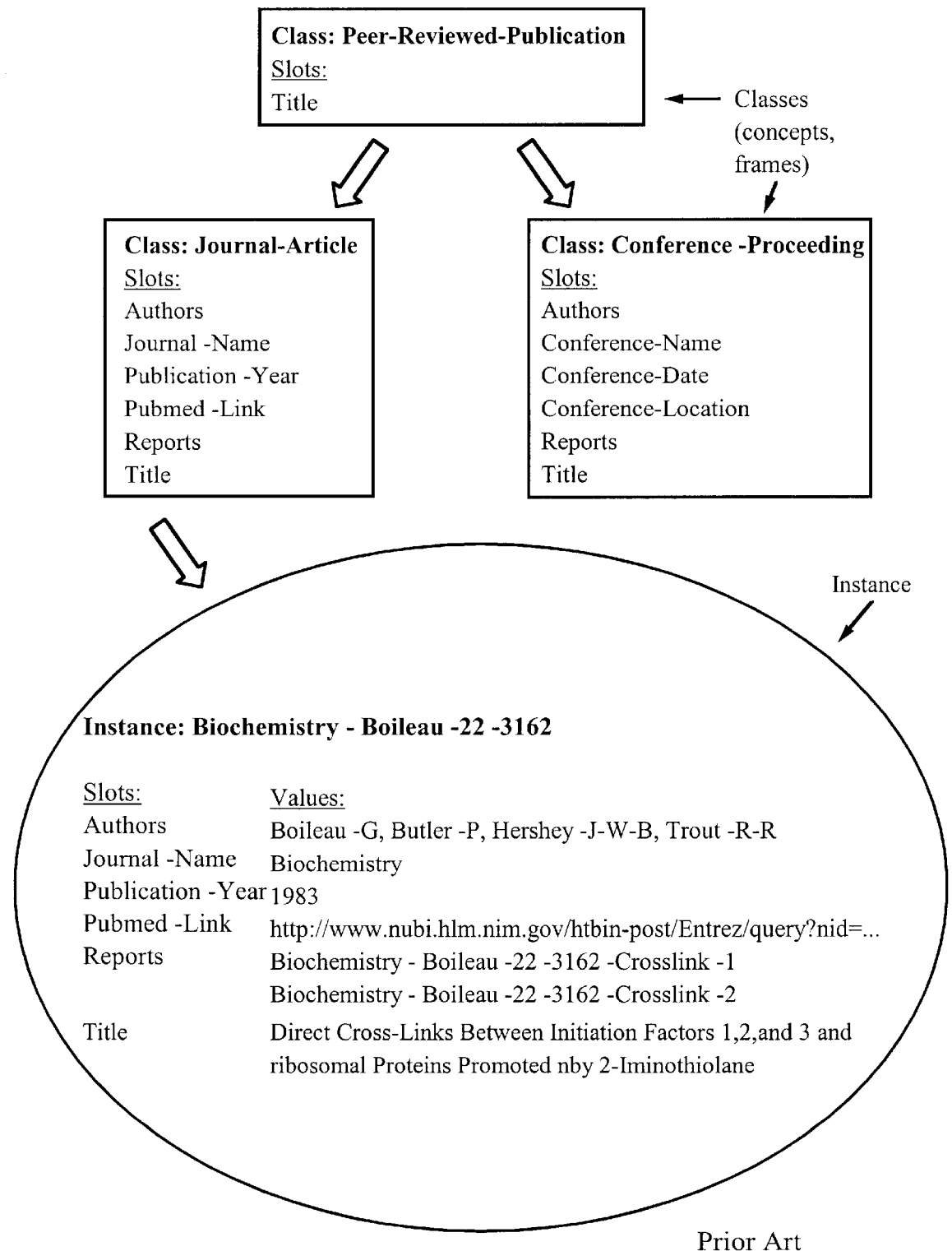
FIG. 3 is a schematic diagram of a fragment of a prior art frame-based data model showing class and instance frames.

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

The present invention, known as Sophia, provides a knowledge base storage system that uses a relational database back-end that is completely transparent to a user or application program. To access the stored data, a user submits standard frame-based queries to the system, which translates the queries into a query format suitable for the relational database. The database query, preferably in Structured Query Language (SQL), is parameterized to use variables supplied by the initial query, but combines these variables with explicit knowledge of the database's table structure to retrieve the correct result.

Although Sophia may be used for storage and access of knowledge bases in any domain of interest, it will be described below with reference to RiboWeb, a particular computer-based environment for cooperative storage and computation of data relating to the structure of the ribosome. RiboWeb has been described in R. B. Altman, M. Bada, X. J. Cahi, M. W. Carillo, R. O. Chen, and N. F. Abernethy, "RiboWeb: An Ontology-Based System for Collaborative Molecular Biology," *IEEE Intelligent Systems*, 14(5), pp. 68–76, 1999. It is to be understood that RiboWeb is an example meant to illustrate, but not limit, the implementation of Sophia.

Sophia uses a standard frame-based knowledge model for organizing the data in the domain of discourse. This knowledge model has been developed in tandem with Open Knowledge Base Connectivity (OKBC), discussed further below, a standard protocol for accessing knowledge bases. The knowledge model contains the following elements:

Classes (also called concepts) are organized in a taxonomy or "is-a" hierarchy that begins with the most general classes and continues to specialize to narrowly defined classes.

Instances occur at the leaves of the hierarchy and are used to store specific data.

Relations can be unitary or binary and are used to organize the classes and instances within the hierarchy.

The set of classes and relations constitute an ontology; the combination of ontology and instances constitutes a knowledge base. FIG. 2 illustrates a class hierarchy used in RiboWeb, with only one branch (Biochemical-Data) fully expanded. Under the primary class Thing are six subclasses: Data, Methods, Organism, Physical-Thing, Reference-Information, and RiboWeb-Output. Each subclass is then further divided into subclasses. A parent class is the class directly above a particular class; for example, Footprinting Data is a parent class of Chemical-Footprinting-Data. Superclasses or ancestor classes include all classes above a particular class; Chemical-Footprinting-Data has as its ancestors Footprinting-Data, Biochemical-Data, Measured-Data, Data, and Thing. Instances (i.e. particular pieces of data) occur only at the ends of each branch; for example, any instance of Biochemical-Data must be further classified into a subclass. However, an instance of a class is also considered to be an instance of each of its superclasses. Any knowledge base used to store data organized into such a hierarchy as shown in FIG. 2 must include basic relations of subclass-of and instance-of. While the organizational structure of data in knowledge bases can be altered as more data is gathered and more relations understood, a conceptual hierarchy similar to the one in FIG. 2 must be determined during design of a particular knowledge base.

A frame-based system contains a particular representation of a knowledge base. It uses frames as primitive objects that represent entities in the domain of discourse. Each object, including classes and instances, in the system is represented as a frame, so called because a frame encloses the entire description of an object. An example of a small fragment of a frame-based knowledge system is illustrated in FIG. 3, with frames shown as rectangles and circles. Rectangles represent class frames, and circles represent instance frames. In FIG. 3, three classes are shown: Peer-Reviewed-Publication; and two of its subclasses, Journal-Article, and Conference-Proceeding. Also illustrated is a particular instance of Journal-Article, Biochemistry-Boileau-22-3162. Frames in the system are linked by "is-a" relationships: Journal-Article is a subclass of Peer-Reviewed-Publication, and Biochemistry-Boileau-22-3162 is an instance of Journal-Article. Associated with each frame are slots and values providing the definitions of the frame. A slot can have a default value that is inherited by the instances underneath the class. Classes have two types of slots: own slots and template slots. Template slots describe slots and values considered to hold for each instance of the class, while own slots hold for the class itself. The slots illustrated in FIG. 3 for each class are template slots. The frame model supports inheritance: a subclass inherits slots and values from a class, and an instance inherits template slots and values from its class. Frames may also contain facets that modify slots and provide secondary information, such as annotations of data types.

Note that values of slots associated with instances may be strings, numbers, or references (i.e. hyperlinks) to other instances. For example, in FIG. 3, one value of the slot Reports is Biochemistry-Boileau-22-3162-Crosslink-1. This value is an instance of the class Cross-Linking-Data. The instance frame for Biochemistry-Boileau-22-3162-Crosslink-1 (not shown) contains specific crosslinking data that were obtained experimentally and reported in this particular journal article. This linking of instances creates a highly interwoven network of data, which cannot in general be adequately represented using a standard relational database and traditional methods. This example also implies that the slot Reports, a binary relation, has particular characteristics; it must have a domain in the class Journal-Articles and a range in the class Data (and its subclasses). Thus, there must be a frame for storing the characteristics of Reports as slots and values. Values of slots may also be links to external online databases or to image files.

Sophia implements a frame knowledge system using a relational database backend and Structured Query Language for querying the database. Any relational database management system, and any server computer, may be used for storing information. Selection of an appropriate RDBMS and server is influenced primarily by the amount of data, number of users, and performance requirements of the system. Two suitable RDBMS are Microsoft Access97, which may be stored on a server computer running the Windows NT operating system; and an Oracle database stored on a server running a Unix operating system.

Each ontology within Sophia is stored in a separate database and consists of three main tables and auxiliary tables. FIG. 4 illustrates a frames table 30, which contains the bulk of the knowledge-base information and includes all instance frame definitions within a single ontology. In FIG. 4, frames table 30 contains data from RiboWeb, for illustration purposes. Frames table 30 contains a frame column 34, a slot column 36, and a value column 38; that is, each record 40 (or row) contains a frame 34, slot 36, and value 38. The full definition of a frame requires several records 40, one for each component slot and value. For example, the frame for the class Rna-Partial-Digestion-Data contains a slot and value for each of the eight records shown. Multiple values of slots are represented with multiple records. Frame names in frame column 34 are unique, although a frame's "pretty-name," used by interfaces to the knowledge base, can be stored in a separate slot associated with the frame. If it becomes necessary in the future to add a new attribute to the definition of the class Rna-Partial-Digestion-Data, a new record is added, with the new attribute in the slot column 36 and the new value of the attribute in the value column 38. New classes may also be added by adding new records. In both cases, no changes to the table structure are necessary; a change in the data model is therefore quite easy to incorporate into the knowledge base.

Frames table 30 also contains an ID column 32 that stores a unique identification code for each record 34. These identification codes are used to facilitate efficient data processing by the system. Also included in frames table 30 are columns essential for system security: an ownership column 42, a permission column 44, and a creation-date column 46. Ownership column 42 specifies who created the data, and thus who can set permissions for other users. The code stored in permission column 44 is a number that tells which users or groups have read or write permission for the record. Creation-date column 46 may be used to determine whether the data is current. In many frame-based systems, additional information about a frame-slot pair is stored in facets; user-defined facets are defined in a separate table. However, for most systems, a core set of facets, including ownerships, permissions, and creation dates, is supported on all slot values. By including particular columns 42, 44, and 46, Sophia supports these core facets much more efficiently. Frames table 30 may also contain a facet column (not shown).

The second main table in each ontology database, the superclass-set (or class hierarchy) table 50, is shown in FIG. 5, again with data from RiboWeb. The superclass-set table 50 contains two columns, a frame column 52 and a superclass column 54. All of the class hierarchy information is contained within the superclass-set table 50. The levels of ancestry are not explicitly indicated; however, they can be determined. For example, Base-Conservation has four superclasses: Data, Measured-Data, Phylogenetic-Data, and Thing. Phylogenetic-Data is listed in frames column 52 (not shown in FIG. 5) with superclasses of Measured-Data, Data, and Thing, and it is therefore obvious (and easily determined by the system) that Phylogenetic-Data is the parent of Base-Conservation. All of the information contained within table 50 can be generated automatically from frames table 30; however, it is precomputed to speed the many queries relying on class-subclass hierarchy.

Finally, the third main table, the classes table 60, shown in FIG. 6, helps manage the class frames. Unlike frames table 30, classes table 60 associates a slot type 62 (either own or template) with each slot 64. The slot type 62 separates the description of the class (own slots) from default properties inherited by its instances (template slots). When a new instance of a class is created, the instance frame contains slots equivalent to template slots associated with the classes of which it is an instance. It may also inherit default values of slots from its ancestor classes. Classes table 60 is therefore essential for creating new instances. Classes table 60 also stores facet information in facet column 66.

In addition to these three tables 30, 50, and 60, each database preferably also contains auxiliary tables that store user membership in groups and group permissions for reading and writing to different knowledge bases. Finally, Sophia contains an additional security database that handles user-group management, ontology permissions for individuals, session logging, and permission codes. For example, the permission code in permission column 44 of frames table 30 is associated with a definition in the security database: such definitions include a particular user or group, or the world.

Figure 7A:
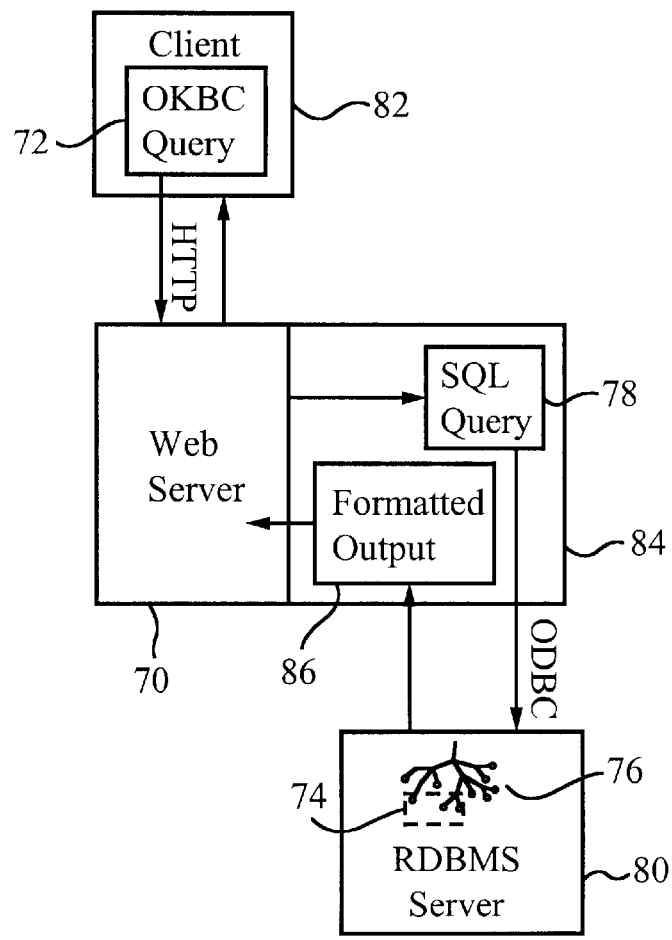
FIG. 7A is a block diagram of a preferred architecture for implementing the present invention.

Sophia may be implemented within a distributed computer system using any desired architecture; a preferred embodiment of an architecture is shown schematically in FIG. 7A. A knowledge base 76 is stored on a relational database server computer 80 which is accessed by a client computer 82 through a Web server 70. Typically, Sophia is used as knowledge base storage for a particular system, such as RiboWeb, which contains additional components also located on Web server 70 or on a different Web server (not shown). A user at client computer 82 communicates with Sophia according to a particular knowledge base protocol and may have no knowledge of the underlying implementation of Sophia, beyond its support of the frame-based knowledge model. The user at client computer 82 uses a Web browser to access the system.

Client computer 82 sends a query 72, in a first format, for a subset 74 of frames contained within knowledge base 76 to Web server 70 (e.g., Microsoft Internet Information Server). Preferably, query 72 is in Open Knowledge Base Connectivity (OKBC) format and is transferred via hypertext transfer protocol (HTTP). After receiving query 72, Web server 70 transfers it to the Sophia program 84, which is preferably written in a scripting language, such as VBScript, JavaScript, or Perl. These scripts 84 perform a variety of functions. Scripts 84 translate query 72 into query 78 in a second or relational database format, preferably Structured Query Language (SQL). Query 78 is then applied to select data from knowledge base 76 stored on server 80. Any one or all of tables 30, 50, and 60 may be accessed during performance of the SQL query 78. Execution of the SQL queries is performed in conjunction with a compatible database connection protocol of choice for connection with server 80.

Preferably, this protocol is Open Database Connectivity (ODBC), but any suitable protocol may be used. The results of query 78, subset 74, are then returned to scripts 84. This function of translating between OKBC and SQL (or similar languages) is an essential feature of Sophia. It allows users to interact with Sophia without having any knowledge of the underlying table structure.

Subset 74 is preferably processed before being transmitted to client computer 82 as formatted output 86. The same scripting language as executed the queries performs the processing. Such processing may include simple or more complex formatting according to the specifications of the user, or may regulate the security of the transaction. Access permissions associated with each frame or value in subset 74 are compared with a client identifier of client computer 82. If client 82 does not have permission to access any data from subset 74, such data will be removed from formatted output 84. This function may also be performed as part of the SQL query. Frames within subset 74 may also be tested to ensure that they are current according to a predetermined standard. Formatted output 84 may be in any format suitable for client computer 82. For example, if client computer 82 accesses knowledge base 76 using a Web browser, formatted output 84 may be an HTML document. Other functions performed by the scripts include application-state tracking and simple inference. That is, the system can infer that an instance of a class is also an instance of a superclass, even though the superclass is not directly associated with the instance in the tables. It can also infer that an instance inherits values from a class or superclass. Simple inference is enabled because this information, while not directly stored with the instance, is stored with a class or superclass and is therefore easily obtained.

Figure 7B:
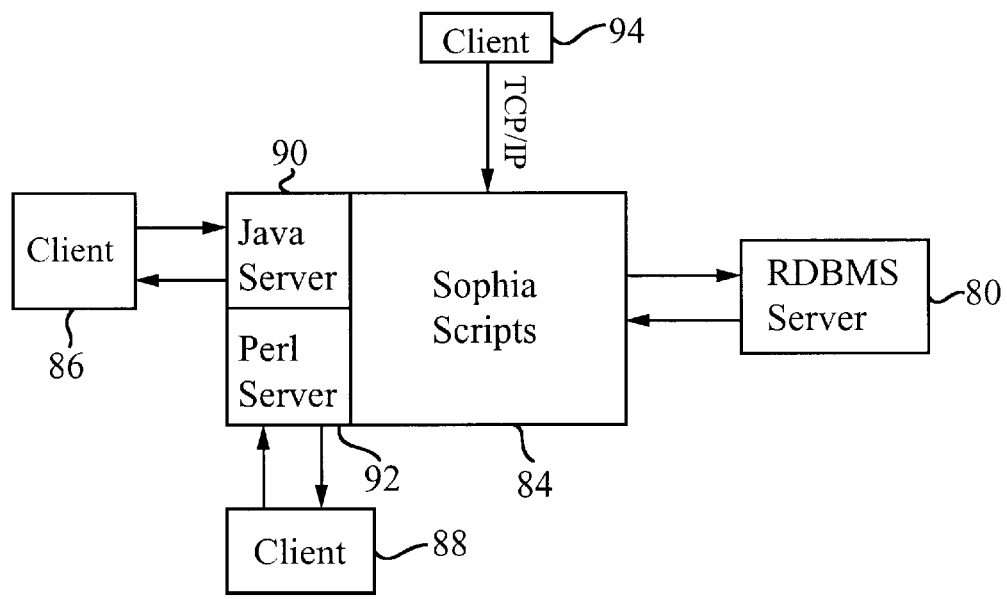
FIG. 7B is a block diagram of an alternate architecture for implementing the present invention.

Alternate embodiments of an architecture for implementing Sophia are shown in FIG. 7B. Scripts 84 and server 80 are identical to those of FIG. 7A. FIG. 7B shows examples of different types of interfaces through which programs may access the knowledge base. Although browsers are useful for human users, Sophia can also be accessed programmatically through its query applications programming interface (API). With the API, Sophia can be used as a remote knowledge server. For example, client 86 running Java and client 88 running Perl may both access Sophia through appropriate servers: Java server 90 and Perl server 92, respectively. Such connections can be made over the Internet using the HTTP protocol and Uniform Resource Locators (URLs). Client 94 connects directly to scripts 84 by establishing a socket connection and communicating using a TCP/IP protocol. Any other types of connections with Sophia may be implemented.

In FIGS. 7A and 7B, the knowledge base is shown stored on server 80, a separate computer from the one on which scripts 84 are located. It is often useful to use a distributed network connection between server 80 and scripts 84. However, Web server 70, scripts 84, and knowledge base 76 may all be stored on a single computer.

The ODBC or other suitable connection between scripts 84 and server 80 allow both read and write operations. That is, adding or editing frames in knowledge base 76 and retrieving frames from knowledge base 76 are performed according to the same protocol and by the same scripts 84. When data is added, client 86 sends a query 72 in a first format to create a new frame. Scripts 84 translate the query into the second format 78, which contains parameters (e.g. slots and values) obtained from the original query 72. A new record is then added to tables 30, 50, and 60 stored on database server 80.

An essential feature of Sophia is that it may be compatible with Open Knowledge Base Connectivity (OKBC), a protocol for accessing knowledge bases stored in knowledge representation systems. Thus, client applications may be written to access Sophia without relying on the details of the knowledge base implementation. OKBC is the emerging standard for knowledge base queries, and thus it is difficult to ensure full compatibility at any given time. Nevertheless, Sophia is designed to be capable of compatibility with OKBC, as its functionality is based on the OKBC data mode. Detailed information about OKBC may be found on the OKBC Home Page at http://www.ai.sri.com/~okbc., or in V. K. Chaudhri et al., "OKBC: A Programmatic Foundation for Knowledge Base Interoperability," Tech. Report KSL-98-08, Knowledge Systems Laboratory, Stanford University, Stanford, Calif., 1998. OKBC provides a set of operations for a generic interface to underlying knowledge representation systems, allowing for development of browsers and editors that may be implemented in a variety of programming languages, including Java, C, and Lisp. Systems that are compatible with OKBC, as is Sophia, allow the specification and retrieval of data models using the OKBC core functions, and thus present a uniform interface, despite the detailed differences of the underlying implementation. OKBC allows data models to be updated dynamically, and also allows new relationships to be established between elements of the data model.

Figure 5:
FIG. 5 illustrates a superclass-set (or class hierarchy) table of the present invention.

OKBC queries, which can be considered to be in a knowledge base format, are implemented in Sophia by translating the queries into a relational database format, preferably SQL. The SQL queries that perform the functions of the corresponding OKBC queries use values supplied by the OKBC queries, but retrieve the results using knowledge of the particular table structure. Most SQL queries use the particular frame 34, slot, 36, and value 38 fields of frames table 30 of FIG. 3 to retrieve data. Frame names collect information for most queries, and restrictions on slot and value cull the data. The three main tables of FIGS. 3, 4, and 5 are designed to facilitate SQL queries: frequently accessed fields are indexed, and superclass-set table 50 is pre-computed to minimize runtime lookup. OKBC queries that are too complex to be translated into a single SQL statement are written as combinations of SQL statements in the scripting language described above. The scripting language may need to perform some data manipulation or simple computations in order to link the individual SQL queries together so as to obtain the desired output.

Any required frame-based queries may be supported by Sophia. In particular, any desired OKBC queries may be translated into SQL. A relational database programmer of average skill will be able to translate any required query into SQL or other suitable database language given the details of the underlying table structure as explained above. The following examples are included for illustration purposes. Two examples of OKBC queries are get-class-instances, which retrieves all instances of a particular class, including direct children and descendents related by subclass relationships; and get-class-subclasses, which retrieves all direct subclasses of a particular class. In SQL written to take advantage of Sophia's particular underlying data structure, these queries look as follows:

get-class-instances:
    SELECT DISTINCT frames.frame
    FROM (frames INNER JOIN frame-types
      ON frames.frame=frame-types.frame)
      INNER JOIN superclass-set
      ON frames.value=superclass-set.frame
    WHERE ((frames.slot="instance-of")
      AND (frame-types.type="instance"
      AND ((superclass-set.superclass={insert class here})
      OR (frames.value=class))));

get-class-subclasses:
    SELECT frames.frame, frames.slot, frames.value
    FROM frames
    WHERE ((frames.slot="subclass-of")
      AND (frames.value={insert class here}));

Functions that are not explicit OKBC commands can also be created, such as delete-frames-by-session, which takes as input a user name and session ID and deletes records the user created during that session.

delete-frames-by-session:
    DELETE * FROM frames
      WHERE frames.frame IN
      (SELECT frame FROM frames as f1
        WHERE f1.slot="Created-In-Session"
        AND f1.value={insert session ID here});

As a further example, OKBC also allows users to insert values into frames and modify values with functions, such as put-slot-value to update a frame's slot value. In the implementation of Sophia, this command is written as follows:

put-slot-value:
    UPDATE [frames] AS f
    SET f.[value]={insert value here},
    WHERE f.[frame]{insert frame here}
      AND f.[slot]=(insert slot here};

As explained with reference to FIGS. 7A and 7B, client computer 82 may access Sophia through a variety of interfaces, including a Web browser and Sophia's query applications programming interface (API). Similar interfaces have been used with prior art frame-based knowledge representation systems. The type of interface dictates the formatting performed by scripts 84 in order to produce formatted output 86. In the case of a Web browser, output from simple SQL queries may be formatted by a simple query interface, such as Active Server Pages, or by the scripting language, to generate HTML documents. Client applications interacting with Sophia through the query API may specify a suitable format for formatted output.

The primary interface with Sophia is a Web browser located on client computer 82. FIG. 8 illustrates a Web-based browser 100 used to access Sophia. Browser 100 is similar to a browser supplied by Ontolingua, and contains three distinct panes: an action/ontology selection pane 102, a query pane 104, and an output pane 106. In selection pane 102, the user selects the browse or edit mode in field 108 and the particular ontology from a drop-down list of ontology field 110. Each ontology is stored in a separate database file. Depending on the user's access permission, the user may edit account information, instances of classes (create, delete, edit, rename, change permission), class hierarchy, and class relations. Preferably, class hierarchy and relations are altered only by system administrators and other privileged users. Sophia also preferably has a means for checking consistency and constraint enforcement of each change to the database performed in edit mode. The user can also navigate the class hierarchy 112. In FIG. 8, class hierarchy 112 is implemented using a Java "treeview" applet, available from R. Berthou, Tliste v.5.20, http://www.javaside.com. The user may open and close different branches of hierarchy 112 as desired. Hierarchy 112 is constructed using superclass-set table 50 of FIG. 5.

Query pane 104 may be used to enter a query for a subset of frames in the knowledge base. Output pane 106 displays output in a variety of forms. As shown in FIG. 8, output pane 106 may display an instance frame; in this case, the instance frame Abb-Cooperman-208-554 is shown and contains all slots and values associated with this particular instance. The user may have obtained this pane by clicking on Publication in selection pane 102. As a result, a query is executed to select all instances of the class Publication, which are displayed in output panel 102 (not shown). Such displayed instances are hyperlinked, so that clicking each instance causes a query to be executed to select the instance frame and its associated slots and values, leading to the display shown in FIG. 8. Depending on the type of query performed, output pane 106 displays output in a suitable format, including tables, as necessary.

FIG. 9 illustrates Sophia's browser in edit mode 120. In selection pane 122, the various options for adding or editing frames or user information are displayed. The edit panel 124 displays the slots and values to be edited. FIG. 9 shows a new class being added to the class hierarchy. A similar mechanism adds or edits all frames, except for instances, which are created using template slots provided from classes table 60 of FIG. 6. When frames are added or edited, scripts 84 of FIG. 7A convert the OKBC query into the corresponding SQL statements to add records to the relevant tables. Generation of HTML forms in which data are entered is known in the art.

It will be clear to one skilled in the art that the above embodiment may be altered in many ways without departing from the scope of the invention. For example, the particular languages OKBC and SQL are current standards for querying knowledge bases and relational databases, respectively. However, as such standards change name or form, the present invention can be adapted to accommodate such changes easily. Such straightforward variations are therefore well within the scope of the present invention. Accordingly, the scope of the invention should be determined by the following claims and their legal equivalents.

What is claimed is:

1. A computer-readable medium encoded with a relational database for storing a frame-based knowledge system having classes, relations, and instances of said classes, said relational database comprising:
   a frames table having columns for storing:
   a) frames comprising class frames representing said classes and instance frames representing said instances;
   b) at least one slot associated with each of said frames, said slots representing said relations and comprising class slots, wherein said relations include an instance-of relation; and
   c) a value associated with each of said slots, said values comprising class values.

2. The computer-readable medium of claim 1 wherein said relational database further comprises a classes table having columns for storing:
   a) said class frames;
   b) said class slots, wherein said class slots are associated with said class frames and comprise own slots and template slots;
   c) said class values, wherein said class values are associated with said class slots; and
   d) a slot type associated with each of said class slots, wherein said slot type comprises own and template, and wherein a corresponding instance frame in said frames table is associated with each template slot associated with a particular class frame, wherein said corresponding instance frame represents a particular instance of a particular class represented by said particular class frame.

3. The computer-readable medium of claim 1 wherein said frames table further comprises a column for storing an access permission associated with each of said slots.

4. The computer-readable medium of claim 1 wherein said frames table further comprises a column for storing an ownership associated with each of said slots.

5. The computer-readable medium of claim 1 wherein said frames table further comprises a column for storing at least one facet associated with each of said slots.

6. The computer-readable medium of claim 1 wherein said relational database further comprises a class hierarchy table having columns for storing said class frames and at least one superclass associated with each of said class frames.

7. In a server in a distributed computer system, a method for querying a frame-based knowledge representation system comprising a set of relational database tables having columns for storing frames and associated attributes said method comprising the steps of:
   a) receiving a query for a subset of said frames from a client computer, wherein said query is in a first format;
   b) translating said query into a second format for querying said tables, wherein said second format comprises a predetermined attribute, wherein said predetermined attribute is related to said query in said first format, and wherein said associated attributes comprise said predetermined attribute;
   c) applying said query in said second format to said set of tables to select said subset, wherein each frame in said subset is associated with said predetermined attribute; and
   d) transmitting output comprising said subset to said client computer.

8. The method of claim 7 wherein said set of relational database tables comprise a frames table having columns for storing:
   a) said frames, wherein said frames comprise class frames and instance frames;
   b) at least one slot associated with each of said frames, said slots comprising class slots associated with said class frames and
   c) a value associated with each of said slots, said values comprising class values associated with said class slots, wherein said associated attributes comprise said slots and said values, and wherein said predetermined attribute comprises a predetermined slot and a predetermined value.

9. The method of claim 8 wherein said set of relational database tables further comprises a classes table having columns for storing said class frames, said class slots, said class values, and a slot type associated with each of said class slots.

10. The method of claim 8 wherein said set of relational database tables further comprises a class hierarchy table having columns for storing said class frames and at least one superclass associated with each of said class frames.

11. The method of claim 7 further comprising the step of processing said subset to generate formatted output, and wherein said transmitted output comprises said formatted output.

12. The method of claim 11 wherein said relational database tables further comprise columns for storing an access permission associated with each of said frames, and wherein said processing step comprises comparing an access permission of each frame in said subset with a client identifier to determine whether said client computer may access said subset.

13. The method of claim 7 wherein said first format is a knowledge base format, and said second format is a relational database format.

14. The method of claim 13 wherein said first format is Open Knowledge Base Connectivity.

15. The method of claim 13 wherein said second format is Structured Query Language.

16. The method of claim 7 wherein said frame-based knowledge representation system is stored on a database computer in said distributed computer system, wherein said database computer is distinct from said server.

17. In a server in a distributed computer system, a method for adding data to a frame-based knowledge representation system comprising a set of relational database tables having columns for storing frames and associated attributes, said method comprising the steps of:
   a) receiving a query to create a new frame from a client computer, wherein said query is in a first format;
   b) translating said query into a second format for querying said tables, wherein said second format comprises parameters related to said query in said first format, wherein said associated attributes comprise said parameters; and
   c) applying said query in said second format to said set of tables to create a new record in said set of tables, wherein said new record represents said new frame and comprises said parameters.

18. The method of claim 17 wherein said set of relational database tables comprises a frames table having columns for storing:
  a) said frames, wherein said frames comprise class frames representing classes and instance frames representing instances;
  b) at least one slot associated with each of said frames, said slots comprising class slots associated with said class frames; and
  c) a value associated with each of said slots, said values comprising class values associated with said class slots;
  wherein said associated attributes comprise said slots and said values, and said parameters comprise a predetermined slot and a predetermined value.

19. The method of claim 18 wherein said set of relational database tables further comprises a classes table for storing said class frames; said class slots, wherein said class slots comprise own slots and template slots; said class values; and a slot type associated with each of said class slots.

20. The method of claim 18 wherein said set of relational database tables further comprises a class hierarchy table for storing said class frames and at least one superclass associated with each of said class frames.

21. The method of claim 17 wherein said new record further comprises a client identifier associated with said client computer.

22. The method of claim 17 wherein said first format is a knowledge base format, and said second format is a relational database format.

23. The method of claim 22 wherein said first format is Open Knowledge Base Connectivity.

24. The method of claim 22 wherein said second format is Structured Query Language.

25. The method of claim 17 wherein said frame-based knowledge representation system is stored on a database computer in said distributed computer system, wherein said database computer is distinct from said server.

* * * * *

UNITED STATES PATENT AND TRADEMARK OFFICE
CERTIFICATE OF CORRECTION

PATENT NO. : 6,442,566 B1
DATED : August 27, 2002
INVENTOR(S) : Russ B. Altman et al.

It is certified that error appears in the above-identified patent and that said Letters Patent is hereby corrected as shown below:

<u>Title page,</u>
Item [75], please amend the first inventor's name: "Russ B. Atman" should be
-- Russ B. Altman --.

Signed and Sealed this

First Day of July, 2003

JAMES E. ROGAN
*Director of the United States Patent and Trademark Office*